United States Patent
Op De Beek et al.

(10) Patent No.: US 7,127,091 B2
(45) Date of Patent: Oct. 24, 2006

(54) METHOD AND APPARATUS FOR VISUALIZING A LIMITED PART OF A 3D MEDICAL IMAGE-POINT-RELATED DATA SET, THROUGH BASING A RENDERED IMAGE ON AN INTERMEDIATE REGION BETWEEN FIRST AND SECOND CLIPPING PLANES, AND INCLUDING SPECTROSCOPIC VIEWING OF SUCH REGION

(75) Inventors: Johannes Catharina Antonius Op De Beek, Eindhoven (NL); Reiner Koppe, Hamburg (DE); Erhard Paul Artur Klotz, Neumuenster (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 754 days.

(21) Appl. No.: 10/023,167

(22) Filed: Dec. 18, 2001

(65) Prior Publication Data

US 2002/0114498 A1    Aug. 22, 2002

(30) Foreign Application Priority Data

Dec. 22, 2000  (EP)  ................................ 00204806

(51) Int. Cl.
*G06K 9/00*  (2006.01)
(52) U.S. Cl. ...................... 382/128; 382/154; 128/922; 345/419
(58) Field of Classification Search ................ 382/128, 382/130, 131, 154; 128/922; 250/363.04; 345/419, 620, 625, 627; 352/60; 600/300; 378/21, 23; 356/611
See application file for complete search history.

(56) References Cited

U.S. PATENT DOCUMENTS

| | | | | |
|---|---|---|---|---|
| 4,835,688 A | * | 5/1989 | Kimura | 345/424 |
| 5,371,778 A | * | 12/1994 | Yanof et al. | 378/4 |
| 6,151,404 A | * | 11/2000 | Pieper | 382/128 |
| 6,289,235 B1 | * | 9/2001 | Webber et al. | 600/426 |
| 6,480,732 B1 | * | 11/2002 | Tanaka et al. | 600/425 |
| 6,542,153 B1 | * | 4/2003 | Liu et al. | 345/424 |
| 6,603,474 B1 | * | 8/2003 | Cobb et al. | 345/421 |
| 2001/0013867 A1 | * | 8/2001 | Watanabe et al. | 345/427 |

FOREIGN PATENT DOCUMENTS

EP    0549182 A2    6/1993

OTHER PUBLICATIONS

Stiel et al.: "Digital Flashing Tomosynthesis: A Promising Technique For Angiocardiographic Screening," IEEE Transactions On Medical Imaging, IEEE Inc. New York, US, vol. 12, No. 2, Jan. 6, 1993, pp. 314-321.

* cited by examiner

*Primary Examiner*—Bhavesh M. Mehta
*Assistant Examiner*—John Strege

(57) ABSTRACT

For visualizing a limited part of a 3D medical image-point-related data set, Selectively, a geometrically selected part of the data set is suppressed and an image rendered based on any non-suppressed part of the data set. The selected geometrically selected part includes a first selection containing all points associated to a nearer region with respect to a first clipping plane, and all points associated to a farther region with respect to a second clipping plane, respectively. The image rendered thereby is based on an intermediate region between the first clipping plane and the second clipping plane.

11 Claims, 3 Drawing Sheets

METHOD AND APPARATUS FOR VISUALIZING A LIMITED PART OF A 3D MEDICAL IMAGE-POINT-RELATED DATA SET, THROUGH BASING A RENDERED IMAGE ON AN INTERMEDIATE REGION BETWEEN FIRST AND SECOND CLIPPING PLANES, AND INCLUDING SPECTROSCOPIC VIEWING OF SUCH REGION

BACKGROUND OF THE INVENTION

Field of the Invention

The invention relates to a method for visualizing a limited part of a 3D medical image-point-related data set. Various different technologies for, in a broadly medical environment, generating a digital 3D imaging data set have been in use, such as 3D-CT, 3D-MRI, 3D-Ultrasound, 3D-Rotational Angio, 3D rotational Xray, and others. The medical environment includes without limitation the use of such visualizing for therapy planning, exploration, teaching, or veterinary, generally as applied to various tissue types that are relevant for living matter. Prior art has proposed to apply a single clipping plane and to ignore all points lying on one side of the clipping plane. The present inventors have recognized further advantages that may be attained by applying two clipping planes and by subsequently considering only the region between the two planes. In particular, such "thick-slab" method would allow a felicitous trade-off between on the one hand single-side clipping that keeps too much information for rendering, and on the other hand the usage of only information that would substantially be restricted to a single plane. The latter procedure would in fact provide only two-dimensional information. The inventors have further recognized that the viewing of the above thick slab would further allow the use of a stereoscopic viewing arrangement to provide a user person with even more pregnant information on the spatial details of the object under consideration.

SUMMARY TO THE INVENTION

In consequence, amongst other things, it is an object of the invention to retain information regarding an imaged region that is essentially three-dimensional, but to keep both information regarding a nearer region with respect to a first clipping plane and also information regarding a farther region with respect to a second clipping plane out of consideration, whilst retaining information of an intermediate region.

In particular, the present invention has as a further object to implement two lines of view of the object that have a slightly diverging angle such as being in a range between 0° and 6° for together providing a three-dimensional stereoscopic image of the intermediately retained region. Furthermore, the inventors have recognized as an additional generating technology for the image point related data set, the feasibility of tomosynthesis. By itself, the tomosynthesis technology focuses on getting only a single plane of image points sharp, but a subsequent parallel shifting or stepping of this plane will allow to cover a region that has the character of a "thick slab" as well. Moreover, the rotating of such single plane over the stereoscopic angle in the same range of values as recited above, will retain the original sharpness and resolution of the single image plane, so that through stepping the stereoscopic pair of planes the technology of tomosynthesis will also allow for applying the principles of the stereoscopic approach on a thick-slab-like region.

BRIEF DESCRIPTION OF THE DRAWING

These and further aspects and advantages of the invention will be discussed more in detail hereinafter with reference to the disclosure of preferred embodiments, and in particular with reference to the appended Figures that show.

GENERAL CONSIDERATIONS

Figure 1:
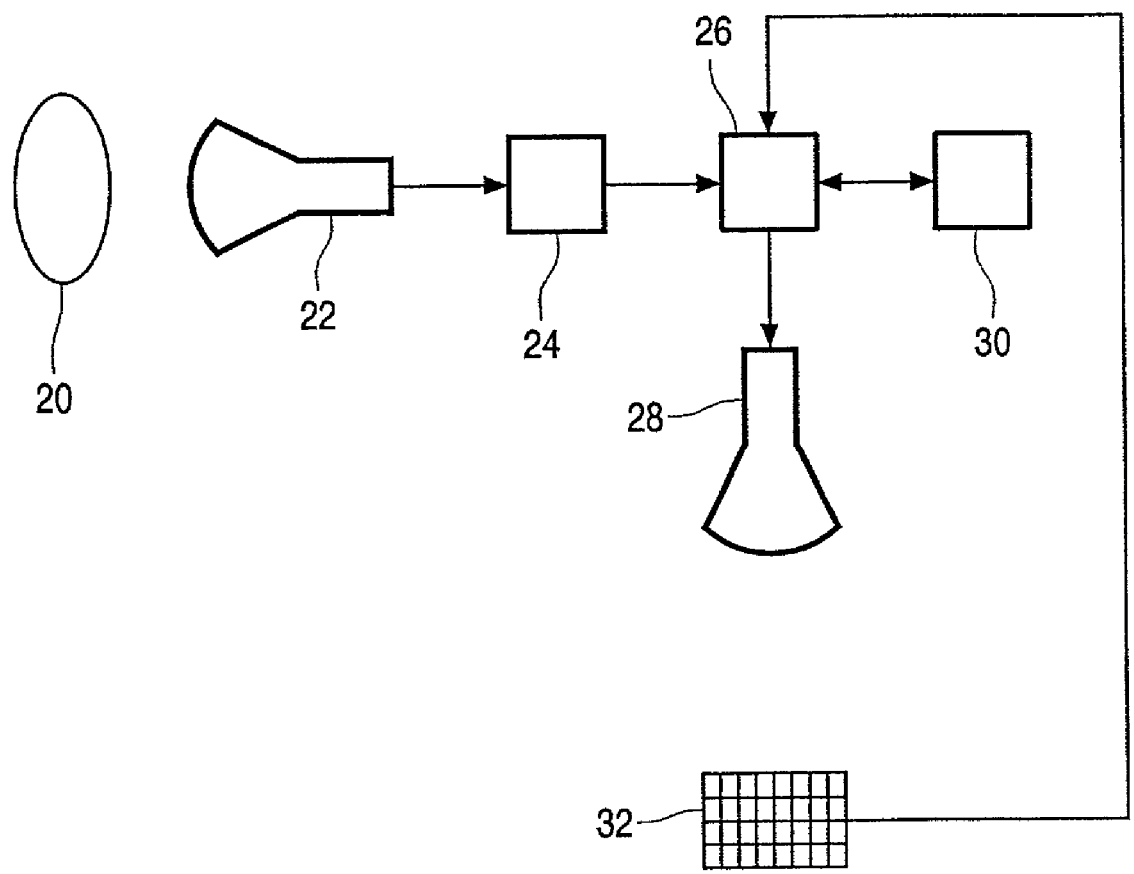
FIG. 1, a general 3D-imaging device.

With respect to considering a clipping function in the context of the present invention, an overall volume will contain tissues of various categories that can cause associated varying imaging intensities. When projecting on a 2D imaging plane, a complex body will often exhibit an interfering or uninteresting nearer part, that may shield off interesting details of an intermediate part, or a farther part that even without such shielding will provide a kind of structural background noise that is superposed on the information of the intermediate part. In this context, the direction of the main viewing axis may be in an arbitrary direction in space. Now, by having the present invention apply two clipping planes, and in particular, but not exclusively, where these are parallel, the rendering may be restricted to the region between the two planes, which then can be viewed and inspected in a much more inquisitive and specific manner. The viewing applies in particular to a thick slab. Such a thick layer or slab may be subjected to various operations, such as to slanting or rotating around a substantially arbitrary axis, to shifting as a whole, to have its size or thickness amended, or to a largely arbitrary combination of these three modes, and possibly combined with still further elemental operations. The degree of parallelism among the two planes may be as good as the technical specifications of an apparatus would allow. On the other hand, a user may for various reasons wish to have the two clipping planes that are not completely parallel. One reason may be that either the object, or rather, interfering objects that are rich in contrast are leaving open a region of interest that is more or less wedge-shaped. The inventors would expect that most of the perceptual advantages of the invention would be attained for wedges with an angle that is less than 60°, whereas for an angle lying below 25° the perceptive view quality would be hardly inferior to that attained at 100% parallelism.

In particular, the inventors have attained three-dimensional, real-time, dynamic manipulation of the image, and may therefore have the latter be dynamically controlled by the user, such as by feed-back through what is being shown effectively.

DETAILED DESCRIPTION OF PREFERRED EMBODIMENTS

The procedure of the present invention will generally start by applying a conventional two-dimensional imaging method such as an X-Ray scan on an intended object. Through repeating the 2D operation along various axes, such as by rotating the object over 180° around an axis that is generally perpendicular to the axis of the "line-of-sight" of the X-Rays, a 3D rotational X-Ray data set is obtained. The decreasing of the above rotation angle substantially below 180° will lower the eventual viewing quality. On the other hand, the increasing of the rotation angle substantially above 180° is generally not cost-effective from the point that it should provide more information.

The original paper in the field is L. A. Feldkamp et al, "Practical Cone-Beam algorithm", J. Opt. Soc. Am. A/Vol. 1, No. 6, June 1984, pages 612–619A. Reference is had also to a paper by M. Grass et al, "Three-Dimensional Reconstruction of High Contrast Objects Using C-Arm Image Intensifier Projection Data", Computerized Imaging and Graphics, Vol. 23 (1999), pages 311–321, inter alia including various resulting images. These algorithms or other high-powered computation algorithms will convert the data set into a 3D point-related data set. This 3D data set may immediately be used for rendering a 3D image of the object on a display screen. This image may be subjected to various motions, such as shifting or rotating for getting the best possible view of the object that may allow to distinguish between arteries, bone, organs and tissues of various other kinds as displayed.

The present inventors have however recognized that a great improvement in image quality will be attainable through clipping off such information that would relate to unwanted or uninteresting points in space, to thereby allow a great improvement in effective visualization conditions. For example, the viewing of tissue regions behind certain bone structures is greatly enhanced when clipping the points associated to these bone structures out of consideration. Similar considerations apply to structures behind the region of interest. The same considerations apply to other diagnostic technologies, such as 3D-MRI, 3D-Ultrasound, 3D-Rotational Angio, 3D-Rotational Xray, and others.

By itself, the use of clipping has been recited by Huseyin Kemal, in "IV0R: Interactive and Intuitive Volume Rendering of 3D-Medical Data with 3D-Texturing Mapping Technique". Here, three mutually perpendicular clipping planes are used, but the present inventors have experienced that limiting the imaged region to an intermediate region between first and second clipping planes is much more useful in the present operating context than the Kemal technique.

FIG. 1 illustrates a general 3D-imaging device. Herein, item 20 is a medical object, such as a part of a human body. Item 22 is a medical imaging system, such as an X-Ray device that provides a pattern of relative transmittivity. For other imaging technologies such as magnetic resonance, ultrasound, angioscopy, and various others, the physical background that would produce the imaging intensity is of course different. Item 24 symbolizes an image processing device that may execute various types of image enhancement operations or other processing. Next, the image is processed in data processing device 26, thereby resulting in the 3D-image-point-related-data set that may be used subsequently for providing the user with an appropriate viewing region. These data are transiently stored in storage device 30, and accessed therein for causing a display on display screen 28. Through an appropriate user interface, such as exemplified by keyboard 32, and generally enhanced by mouse-type or other features not shown for clarity, a user person may select various image positions or directions for associating thereto a clipping plane. This selecting will be retrocoupled to device 26 for thereupon amending the display in that all image points representing either a region that is nearer to the viewer than the region of interest, or rather representing a region that is farther away from a viewer than the region of interest, are suppressed from being rendered on a display screen. If necessary, the process of selecting the clipping planes may continue, either in a trial and error procedure by hand, or according to a prespecified and computer-controlled policy. If applicable, a particular imaged structure so found may be stored in memory as is for repetitive usage.

FIGS. 2a–2d illustrate the principle of the various "thick-layer mode" functions. First in FIG. 2a, a reconstruction volume in the shape of an object cube is illustrated as being described by one of its principal diagonals AA'. The central point of the volume is the so-called stereo-cursor B at the intersection point of the four principal diagonals of the cube. Now, the axis of a rotation over 180° during the acquisition of information for allowing to image the space identified by the Figure may be vertical in world space, and also vertical through the stereo cursor point B. Now, a first clipping plane may be shifted parallel from point A to point C as shown. Furthermore, a second clipping plane may be shifted parallel to the first clipping plane from point A to point C' as shown. Within the cube described by principal diagonal AA', a thinner block or slab is now defined by its principal diagonal CC'. It has been found that much medical information may be acquired by restricting the imaging to the intermediate region between the two clipping planes. A differential shifting between the two clipping planes would allow to have a thick slab of variable size. Of course, a further particular type of manipulating of the thick slab would be the parallel shifting of the two clipping planes together. In certain situations, the two clipping planes need not be completely parallel. The amount of deviation from parallelism is may be suggested by the shapes of any interfering structures in the object. A deviation of less than 25° is expected to give only a slight deterioration in essence whilst allowing to ignore various types of interfering structures. In some situations a deviation of somewhat less than 60° could even be advantageous. These procedures could then be accompanied by shifting as well as by rotating of the clipping plane or planes.

Figure 2A:
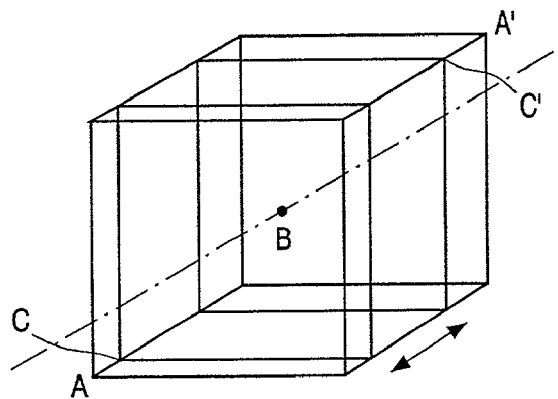
FIGS. 2a–2d, the principle of the various "thick-layer mode" functions.
Figure 2B:
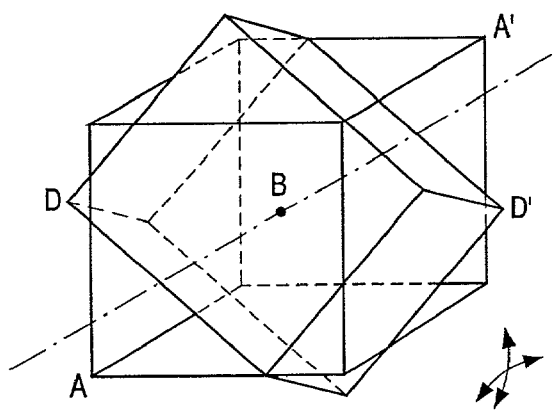

FIG. 2b by way of example to parallel clipping planes and illustrates the combination of introducing the two clipping planes according to the present invention as being combined with the rotating of the thick slab around an arbitrary axis. In the Figure, this rotation may be described as a first rotation around the line-of-sight through the video cursor B, combined with a second rotation around a horizontal line through the video cursor B. Of course, further rotations are feasible, such as around a vertical line through the video cursor B. In principle, any rotational position would be attainable. Through each such rotation, the thick slab is still being described by its principal diagonal DD'. The rotations may have arbitrary axis and angle. Of course, the rotation may be used in combination with the differential and parallel types of shift recited supra.

Figure 2C:
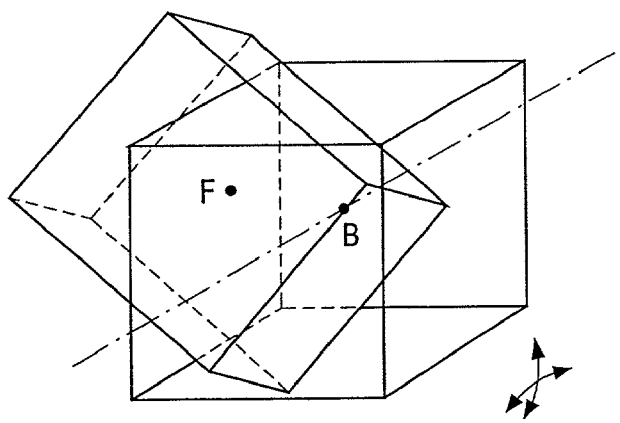

FIG. 2c illustrates the combination of the rotations introduced in FIG. 2b with a movement in three-dimensional space of the stereo cursor from position B to position F. In this manner, FIGS. 2a–2c describe all possible reconfigurationing of the imaging thick slab. In a similar manner, the nearer and farther planes need not be fully parallel. Such could be advisable if the configurations of wanted versus unwanted points would not match a flat slab, but rather one that had a varying thickness along its extension.

Figure 2D:
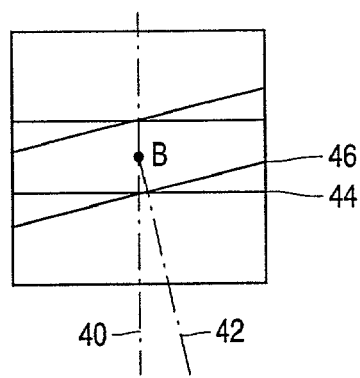

FIG. 2d proposes a configuration for attaining a stereoscopic view of the object in combination with the thick slab approach. In fact, the Figure represents a view of FIG. 2a's cube as seen from above. There are now two slabs 44 and 46 of identical thicknesses and coinciding stereo cursor, but differential rotations, such as over an angle of a few degrees in the range of 0–6°. Now, the normal lines (40, 42) to the surfaces have become dilatated, so that the combined slabs will allow stereotactic viewing through the use of an appropriate stereo goggle, each eyeglass pertaining to a respective slab. By itself, such goggles have been in wide use, such as for viewing pseudo-stereo movie pictures.

Figure 3A:
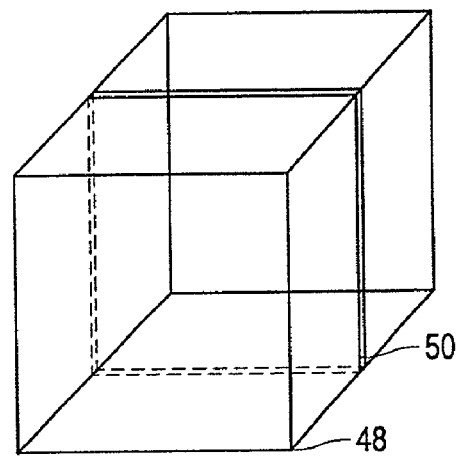
FIGS. 3a–3b, the building of a "tomosynthesis thick layer" through superposing a plurality of successive "thin layers"
Figure 3B:
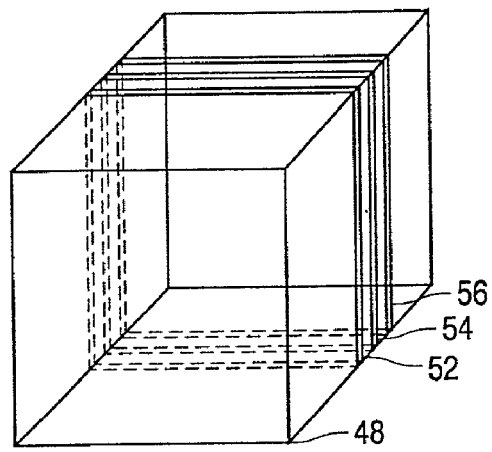

FIGS. 3a–3b illustrate the building of a "tomosynthesis thick layer" through superposing a plurality of successive "thin layers" By itself, persons of ordinary skill in the art of medical imaging will recognize the technology of tomosynthesis, and reference is had in this respect to standard University Textbooks. As shown in FIG. 3a, standard application of such technology to a spatial object cube 48 similar to that of FIG. 2a will allow to get accurate visual information on points within a thin slab or pseudo-plane 50; the sharpness of such point informations will however quickly diminish for points a bit outside pseudo-plane 50. FIG. 3b illustrates the effect of repeating the same measurements while stepping or shifting this pseudo-plane along staggered positions 52, 54, 56. Superposing the results so acquired for the respective pseudo-planes will allow to quite acceptably reconstruct the "thick slab" of FIG. 2a. The front and rear pseudo-planes in this case will conceptually closely corresponding to the nearer and farther clipping planes, respectively. To attain this effect, the spacings of the positions 52–56 must be neither too large nor too small. If too small, the various pseudo planes will generate interference; if too large, relevant information on the regions between two pseudo-planes will tend to get lost.

Figure 4A:
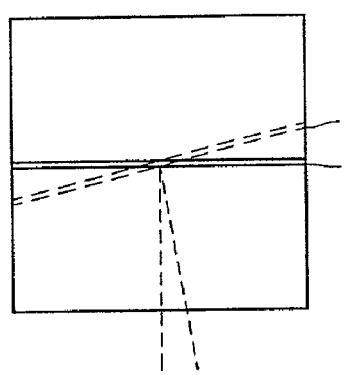
FIGS. 4a–4b, the formation of a spatial spectroscopic image through this superposing of successive thin layers.
Figure 4B:
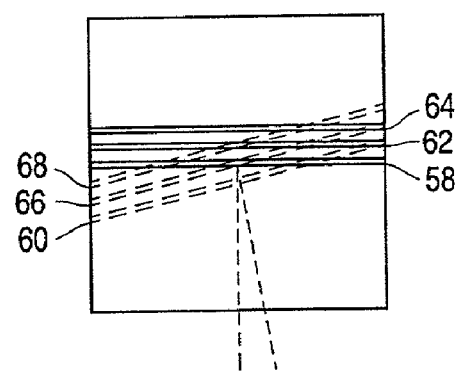

FIGS. 4a–4b illustrate the formation of a spatial spectroscopic image through the superposing of successive thin layers as introduced in FIG. 3a. First, FIG. 4a in the same manner and direction of view (i.e. again as seen from above) as FIG. 2d proposes a rotation between the respective directions of view for the two pseudo-planes 58, 60, the latter in this manner constituting a so-called "stereo couple-"Due to the fact that the information relaxates away from the pseudo-plane, there still is quite a lot of useful information present inside pseudo-plane 60, especially so in the central region of the block. Next, these stereo couples are shifted in the same manner as in FIG. 3b, in this elementary embodiment represented by the respective stereo couples 58/60, 62/66, and 64/68. The shifting is undertaken under maintaining of the orientations of the pseudo-planes. This then has as a result that especially the central part of the block may be viewed in the same stereotactic manner as discussed with respect to FIG. 2d, but now being based on tomosynthesis and the inherent qualities and advantages offered by this sophisticated technology. Furthermore, the three manipulation functions of differential and parallel shifting and rotating as discussed with reference to FIGS. 2a, 2b may be applied here in similar manner, thereby effecting comparable perceptive and ergonomic advantages as the earlier embodiment.

The invention claimed is:

1. A method for visualizing a limited part of a 3D medical image-point-related data set, said method being based on selectively suppressing a geometrically selected part of the data set and rendering an image based on any non-suppressed part of the data set, said method being characterized in that said selected part comprises a first selection containing all points associated to a nearer region with respect to a first clipping plane and moreover all points associated to a farther region with respect to a second clipping plane, respectively, thereby making the rendered image being based on an intermediate region between said first clipping plane and said second clipping plane, wherein said first clipping plane and said second clipping plane cooperate to form a stereoscopic plane couple that when differentially shifted to other positions maintains the orientations of associated pseudo-planes, and that when superposing point information pertaining to various stereo couple a three-dimensional stereo image of a region covered by such shifted stereo couples is derivable.

2. A method as claimed in claim 1, wherein said first clipping plane and said second clipping plane are substantially parallel planes.

3. A method as claimed in claim 1, wherein said first and second clipping planes are substantially parallel to an imaging plane.

4. A method as claimed in claim 1, wherein said intermediate region is dimensioned to encompass a region of imaging interest.

5. A method as claimed in claim 1, and allowing user manipulation for said intermediate region as being based on either one of a differential shifting, a parallel shifting, or a rotation of said first and second clipping planes.

6. A method as claimed in claim 1, wherein said first clipping plane and said second clipping plane constitute a diverging angle that is less than 60°, and preferable, less than 25°.

7. A method for visualizing each of a first limited part and a second limited part of a 3D medical image-point-related data set each respectively as claimed in claim 1, wherein said first and second limited parts are substantially coinciding but associated to respective stereoscopic lines of view, and said method furthermore providing for viewing a three-dimensional stereo image of said intermediate region through combined viewing of said first and second limited parts.

8. A method for visualizing a limited part of a 3D medical image-point-related data set generated through applying a Tomosynthesis procedure, with respect to a selected part of the data set and rendering an image based on any non-suppressed part of the data set, said method being characterized by combining a first imaging plane associated to a first stereoscopic line of view and a second imaging plane associated to a second stereoscopic line of view to a first stereoscopic plane couple, and to differentially shift said stereoscopic plane couple to other positions whilst maintaining the orientations of their associated pseudo-planes, and superposing the point informations pertaining to the various stereo couples to produce a three-dimensional stereo image of a region covered by such shifted stereo couples.

9. An apparatus for visualizing a limited part of a 3D medical image-point-related data set, said apparatus comprising:

pickup means for deriving from a tissued object various two-dimensional information sets and being coupled to data processing means for therefrom generating a three-dimensional data set for displaying on a display facility coupled therewith, selection means associated with said data processing means for selectively suppressing a geometrically selected part of the data set for subsequent rendering on said display facility of an image based on any non-suppressed part of the data set, said apparatus being characterized in that said selection means are arranged for implementing a first selection containing all points associated to a nearer region with respect to a first clipping plane and moreover all points associated to a farther region with respect to a second clipping plane, respectively, thereby making the rendered image being based on an intermediate region between said first clipping plane and said second clipping plane, said first clipping plane and said second clipping plane cooperate to form a stereoscopic plane couple that when differentially shifted to other positions maintains the orientations of associated pseudo-planes, and that when superposing point information pertaining to various stereo couples a three-dimensional stereo image of a region covered by such shifted stereo couples is derivable.

10. An apparatus arranged for visualizing each of a first limited part and a second limited part of a 3D medical image-point-related data set each respectively as claimed in claim 9, wherein said first and second limited parts are substantially coinciding but associated to respective stereoscopic lines of view, and said apparatus being furthermore arranged for providing the viewing a three-dimensional stereo image of said intermediate region through combined viewing of said first and second limited parts.

11. An apparatus for visualizing a limited part of a 3D medical image-point-related data set, said apparatus comprising a Tomosynthesis pickup and processing means, with respect to a selected part of the data set and rendering an image based on any non-suppressed part of the data set, said method being characterized by combining a first imaging plane associated to a first stereoscopic line of view and a second imaging plane associated to a second stereoscopic line of view to a first stereoscopic plane couple, and to differentially shift said stereoscopic plane couple to other positions whilst maintaining the directions of their associated pseudo-planes, and superposing the point informations pertaining to the various stereo couples to produce a three-dimensional stereo image of a region covered by such shifted stereo couples.

* * * * *